United States Patent [19]

Funato et al.

[11] Patent Number: 4,849,495

[45] Date of Patent: Jul. 18, 1989

[54] POLYESTER RESIN FROM TRI- OR HIGHER POLYCARBOXYLIC ACID FOR TONER AND PROCESS FOR ITS PRODUCTION

[75] Inventors: Ryo Funato; Shinji Kubo, both of Nagoya; Noriyuki Tajiri, Toyohashi; Hirokazu Ito, Toyohashi; Hitoshi Iwasaki, Toyohashi, all of Japan

[73] Assignee: Mitsubishi Rayon Company Limited, Tokyo, Japan

[21] Appl. No.: 200,416

[22] Filed: May 31, 1988

[30] Foreign Application Priority Data

Oct. 19, 1987 [JP] Japan ................... 62-263277

[51] Int. Cl.$^4$ .................. C08G 63/18; C08G 63/32
[52] U.S. Cl. ..................... 528/194; 528/176; 528/180; 528/181
[58] Field of Search ............... 528/176, 194, 180, 181

[56] References Cited

U.S. PATENT DOCUMENTS 4,387,211  6/1983  Yasuda et al. ................ 528/194

Primary Examiner—Harold D. Anderson
Assistant Examiner—T. Mason
Attorney, Agent, or Firm—Cushman, Darby & Cushman

[57] ABSTRACT

A polyester resin for toner, which consists essentially of (a) from 5 to 60 equivalent %, based on the entire carboxylic acid components, of at least one member selected from the group consisting of tribasic and higher polybasic carboxylic acids, anhydrides thereof and lower alkyl esters thereof, (b) at least one member selected from the group consisting of dicarboxylic acids and lower alkyl esters thereof, (c) at least one aromatic diol and (d) at least one aliphatic diol, and which has a softening temeprature of from 100° to 170° C., a glass transition temperature (Tg) of from 50° to 70° C., an acid value of from 0.5 to 10 mgKOH/g and a gel content of from 3 to 40%.

8 Claims, No Drawings

POLYESTER RESIN FROM TRI- OR HIGHER POLYCARBOXYLIC ACID FOR TONER AND PROCESS FOR ITS PRODUCTION

The present invention relates to a polyester resin for dry toner to be used for developing an electrostatic image in electrophotography, electrographic recording or electrostatic printing, and a process for its production. More particularly, it relates to a polyester resin for dry toner having excellent offset resistance and excellent electrical properties, and a process for its production.

In a method for forming a permanent visible image from an electrostatic latent image, an electrostatic latent image formed on a photoconductive photosensitive material or on an electrographic recording material is developed by means of a preliminarily triboelectrically charged toner, followed by fixing. The fixing is conducted either by directly fusing the toner image formed by the development on the photoconductive photosensitive material or on the electrographic recording material, or by transferring the toner image on a paper or film and then fusing it on a transfer sheet. The fusing of the toner image is conducted by contacting with a solvent vapor, pressing or heating. The heating system includes a non-contact heating system by means of an electric oven and a press-heating system by means of heat rollers. The latter is mainly used recently, since a high speed is required for the fixing step.

Toners which may be used for a dry development system include a one component toner and a two component toner. The two component toner is prepared by firstly melt-mixing a resin, a coloring agent, a charge controlling agent and other necessary additives to adequately disperse them, followed by rough pulverization, fine pulverization and classification into a predetermined range of particle size. The one component toner is prepared in the same manner by adding a magnetic iron powder in addition to the above-mentioned various components for the two component toner.

The resin is the main component of a toner and thus governs the major properties required for the toner. Therefore, the resin for toner is required to provide good dispersibility of a coloring agent in the melt mixing step and excellent pulverizability in the pulverization step in the production of a toner. Further, in the use of the toner, it is required to provide various properties such as excellent fixing properties, offset preventing properties, blocking resistance and electrical properties. As resins useful for the production of toners, epoxy resins, polyester resins, polystyrene resins, methacrylate resins, etc. are known. For the press-heating fixing system, styrene (meth)acrylate copolymers have been mainly used. However, an attention has recently been drawn to polyester resins, since it is possible to conduct fixing at a low temperature and the fixed toner image is excellent in the resistance against a polyvinyl chloride plasticizer.

A polyester resin is produced usually by a condensation reaction of a dicarboxylic acid or its lower alkyl ester with a diol by direct esterification or by ester interchange. For a polyester resin for toner, it has been proposed to use in addition to the above monomers a trivalent or higher polyvalent carboxylic acid or alcohol for co-polycondensation to form a weakly crosslinked structure to provide offset resistance during the fixing step. However, toners prepared by using conventional polyester resins obtained by such co-polymerization with a trivalent or higher polyvalent carboxylic acid or alcohol had drawbacks such that the electrical properties were poor i.e. the negative chargeability was substantial, the humidity dependency of the electrification was substantial, and the image quality varied depending upon the environment, and an improvement has been desired.

The present inventors have studied the conventional technique to find out the reason why the electrical properties of the toner deteriorate by the co-polycondensation of a trifunctional monomer while the offset resistance of the toner can be thereby improved, and have found that such a deterioration is attributable to a high acid value of the polyester resin. Namely, in order to obtain excellent offset resistance by the co-polycondensation of a trifunctional monomer, it is usually required to let the condensation reaction proceed until a suitable crosslinked structure is formed. However, the viscosity of the reaction system tends to increase rapidly so that the product can not be taken out from the reactor, or the reaction is hardly controllable, whereby it used to be difficult to obtain the desired resin. Therefore, it was necessary to take out the polymer without permitting it to react to have an adequate crosslinked structure. Consequently, the intended improvement of the offset resistance could not be attained, or the condensation reaction could not be adequatetly conducted so that the resin tended to have a high acid value, whereby the electrical properties were poor. Namely, in the conventional technique, it was difficult to satisfy both requirements i.e. to provide a suitable crosslinked structure necessary for offset resistance and to provide a low acid value necessary for excellent electrical properties, simultaneously.

The present inventors have conducted extensive researches to solve such problems and have found a polyester resin having both excellent offset resistance and electrical properties and a process for its production. The present invention has been accomplished on the basis of this discovery.

The present invention provides a polyester resin for toner, which consists essentially of (a) from 5 to 60 equivalent %, based on the entire carboxylic acid components, of at least one member selected from the group consisting of tribasic and higher polybasic carboxylic acids, anhydrides thereof and lower alkyl esters thereof, (b) at least one member selected from the group consisting of dicarboxylic acids and lower alkyl esters thereof, (c) at least one aromatic diol and (d) at least one aliphatic diol, and which has a softening temperature of from 100° to 170° C., a glass transition temperature (Tg) of from 50 to 70° C., an acid value of from 0.5 to 10 mgKOH/g and a gel content of from 3 to 40%.

The present invention also provides a process for producing a polyester resin for toner by the condensation reaction of (a) from 5 to 60 equivalent %, based on the entire carboxylic acid components, of at least one member selected from the group consisting of tribasic and higher polybasic carboxylic acids, anhydrides thereof and lower alkyl esters thereof, (b) at least one member selected from the group consisting of dicarboxylic acids and lower alkyl esters thereof, (c) at least one aromatic diol and (d) at least one aliphatic diol in the presence of a catalyst, which comprises reacting the carboxylic acid components (a) and (b) with the diol components (c) and (d) for esterification or ester interchange under a condition to satisfy the formula:

$$4 > Y > 0.8(1+x) \quad (i)$$

where $$y = \frac{2 \times \text{mols of diol components (c) and (d)}}{\text{mols of carbonyl groups in entire carboxylic acid components (a) and (b)}}$$

$$x = \frac{\text{mols of carbonyl groups in carboxylic acid component (a)}}{\text{mols of carbonyl groups in entire carboxylic acid components (a) and (b)}}$$

followed by crosslinking while distillating off the diol components under a reduced pressure of at most 150 mmHg, then substantially terminating the crosslinking reaction by raising the pressure of the reaction system, to obtain a polyester resin having a softening temperature of from 100° to 170° C., a glass transition temperature (Tg) of from 50° to 70° C., an acid value of from 0.5 to 10 mgKOH/g and a gel content of from 3 to 40%.

Now, the present invention will be described in detail with reference to the preferred embodiments.

The polybasic carboxylic acid component (a) which may be used in the present invention includes, for example, trimellitic acid, trimellitic anhydride, anhydrous methyl trimellitate, anhydrous ethyl trimellitate and trimethyl trimellitate. Among then, trimellitic anhydride is particularly preferred. Trimellitic anhydride is highly reactive, wherein a resin having a carosslinked structure can readily be obtained.

The dicarboxylic acid component (b) which may be used in the present invention includes, for example, terephthalic acid, isophthalic acid, sebacic acid, isodecyl succinic acid, maleic acid and fumaric acid and monomethyl-, monoethyl-, dimethyl- and diethyl-esters thereof. Among them, terephthalic acid, isophthalic acid and dimethyl esters thereof are particularly preferred.

Further, in order to improve the fixing properties, an aliphatic dicarboxylic acid such as sebacic acid, isodecyl succinic acid, maleic acid or fumaric acid, may be used in combination.

The proportion of the polybasic carboxylic acid component (a) in the entire carboxylic acid components (a) and (b) substantially affects the properties of the toner. According to the present invention, when the proportion is large, the blocking resistance tends to be low. On the other hand, when the proportion is small, the offset resistance tends to be low. Accordingly, the proportion of the polybasic carboxylic acid component (a) in the entire carboxylic acids components (a) and (b) is required to be within a range of from 5 to 60%. It is preferably within a range of from 5 to 35%.

The aromatic diol (c) which may be used in the present invention includes, for example, polyoxypropylene-(n)-polyoxyethylene-(n')-2,2-bis(4-hydroxyphenyl)propane, polyoxypropylene (n)-2,2-bis(4-hdyroxyphenyl)propane, polyoxyethylene (n)-2,2-bis(4-hydroxyphenyl)propane, and polyoxypropylene (n)-hydroquinone (wherein each of n and n' is a number of from 2 to 6). Particularly preferred is polyoxypropylene (2.4)-2,2-bis(hydroxyphenyl)propane of the formula:

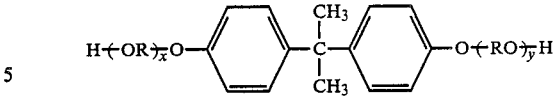

wherein R is an alkylene group having 3 carbon atoms, and each of x and y is 1 or 2. These diols may be used alone or in combination as a mixture.

The aliphatic diol (d) which may be used in the present invention includes, for example, ethylene glycol, neopentyl glycol, butanediol and polyethylene glycol. Among them, ethylene glycol, neopentyl glycol and butanediol are particularly preferred from the viewpoint of fixing properties.

If the proportion of the aromatic diol (c) in the entire diol components (c) and (d) is large, the reactivity tends to be low, while the blocking resistance and the electrical properties will be good. Further, if only the aromatic diol component (c) is used, the reactivity tends to be extremely low, and it will be impossible to conduct reproduction. Conversely, if the proportion of the aromatic diol is small, the reactivity tends to be high although the blocking resistance and the electrical properties tend to be low. Therefore, the proportion of the aromatic diol (c) in the entire diol components (c) and (d) is preferably within a range of from 20 to 90 equivalent %.

The most important point of the present invention is that the resin obtained by the condensation of the above-mentioned monomers is a polyester having a softening point of from 100° to 170° C., a glass transition temperature (Tg) of from 50° to 70° C., an acid value of from 0.5 to 10 mgKOH/g and a gel content of from 3 to 40%.

If the softening temperature is lower than 100° C., the blocking resistance tends to be poor although the fixing properties may be good. On the other hand, if the softening temperature exceeds 170° C., the fixing properties tend to be poor. Therefore, the softening temperature should be within a range of from 100° to 170° C., preferably from 110° to 160° C.

If Tg is lower than 50° C., the fixing properties will be good, but the blocking resistance tends to be extremely poor. On the other hand, if Tg exceeds 70° C., the fixing properties tend to be poor. Therefore, Tg should be within a range of from 50° to 70° C., preferably from 55° to 70° C.

If the acid value is less than 0.5 mgKOH/g, the dispersibility of a coloring agent tends to be low. On the other hand, if it exceeds 10 mgKOH/g, the negative chargeability tends to be substantial, and the humidity dependency of the chargeability tends to be substantial and the image quality varies depending upon the environment. Therefore, the acid value should be within a range of from 0.5 to 10 mgKOH/g, preferably from 1 to 10 mgKOH/g.

If the gel content is less than 3%, the fixing properties may be improvd, but the offset resistance required for a toner tends to be poor. On the other hand, if the gel content exceeds 40%, the offset resistance will be good, but the fixing properties tend to be extremely poor. Therefore, the gel content should be within a range of from 3 to 40%, preferably from 5 to 30%.

Now, the process for the production of the polyester resin of the present invention will be described.

In the present invention, the esterification reaction or the ester interchange reaction is conducted by heating a mixture comprising the tribasic or higher polybasic carboxylic acid component (a), the dicarboxylic acid component (b) and the diol components (c) and (d) in the proportions to satisfy the above-mentioned formula (I). For this reaction, it is possible to use an esterification or ester interchange catalyst which is commonly used for an esterification or ester interchange reaction, such as sulfuric acid, titanium butoxide, dibutyltin oxide, magnesium acetate or manganese acetate, as the case requires.

In the present invention, the amounts of the diol components (c) and (d) are required to satisfy the above formula (1) in order to prevent gelation during the esterification or ester interchange reaction.

Then, after the esterification or ester interchange reaction, water or alcohol formed by the reaction is removed by a conventional method.

In the present invention, the polymerization reaction will follow. The polymerization is conducted under a reduced pressure of at most 150 mmHg while distilling off the diol components (c) and (d).

For the polymerization, a usual known polymerization catalyst such as titanium butoxide, dibutyltin oxide, tin acetate, zinc acetate, tin disulfide, antimony trioxide or germanium dioxide may be employed.

In this reaction, the crosslinking polymerization reaction proceeds as the diol components (c) and (d) are distilled off. Thus, it is possible to obtain a polyester having a desired crosslinking degree by controlling the amount of the distillation of the diol components (c) and (d). Therefore, in the present invention, a product having a desired crosslinking degree can be obtained simply by controlling the vacuum degree (i.e. simply by raising the pressure of the system) during the polymerization reaction.

With respect to the polymerization temperature and the amount of the catalyst, there is no particular restriction, and they may suitably be set as the case requires.

The distillation of the diol components (c) and (d) is determined by the vacuum degree and the temperature of the reaction system. The vacuum degree is preferably at most 150 mmHg, more preferably at most 30 mmHg, taking into consideration the pressure condition of the system to terminate the polymerization reaction.

By such a specific manner of operation, it is for the first time possible to produce a polyester which satisfies both a low acid value at a level of from 0.5 to 10 mgKOH/g required to provide excellent electrical properties and a gel content of from 3 to 40% required to provide adequate offset resistance when used as a toner.

In the present invention, the softening temperature of the polyester resin is a temperature at which one half of 1 g of a sample flows out when measured by means of Flow Tester CFT-500 (manufactured by Shimadzu Corporation) with a nozzle of 1 mm in diameter×10 mm under a load of 30 kg at a constant temperature raising rate of 3° C./min.

Tg is a temperature at the intersection of the base line of a chart and the tangent line of an absorption curve in the vicinity of Tg when measured by means of a differential scanning calorimeter at a temperature raising rate of 10° C./min.

The acid value is the mg value of KOH required for neutralization by a usual neutralizaing titration with a KOH solution.

For the determination of the gel content, 0.5 g of a sample is put into 50 ml of tetrahydrofuran and dissolved under heating at 70° C. for 3 hours, and the solution is filtered through a glass filter packed with Cellite #545, followed by drying thoroughly in a vacuum dryer at 80° C., whereupon the dry weight is divided by the initial weight to obtain a gel content. Namely, the gel content is a value obtained by dividing the dry weight of the product by the initial weight of the sample.

Now, the present invention will be described with reference to Examples. However, it should be understood that the present invention is by no means restricted by such specific Examples.

EXAMPLE 1

To a monomer mixture consisting of trimellitic anhydride as the polybasic carboxylic acid component (a), terephthalic acid and isophthalic acid as the dicarboxylic acid components (b), polyoxypropylene (2.4)-2,2-bis(4-hydroxyphenyl)propane as the aromatic diol (c) and ethylene glycol as the aliphatic diol (d) in the proportions as identified in Table 1 and having an equivalent ratio of the entire diol components to the entire carboxylic acid components of 1.27, dibutyltin oxide was added as the polymerization catalyst in an amount of 0.03% by weight based on the polybasic carboxylic acid component (a). The mixture was introduced into a separable flask equipped with a condenser, a thermometer and a stirrer. The flask was heated at a temperature of 220° C. on an oil bath, and the mixture was melted and stirred for esterification. Water was firstly distilled from the reaction system. After the distillation of water terminated, a vacuum pump was connected to the separable flask and the pressure in the reaction system was reduced gradually. When the pressure was reduced to 0.1 mmHg, the condensation reaction was initiated, and the diols were distilled from the reaction system. The crosslinked structure was formed as the stirring torque gradually increased. Then, vacuuming was stopped to terminate the reaction when the stirring torque reached a level close to the upper limit at which the reaction product could still be taken out from the reactor.

The products R1, R2 and R3 thereby obtained were all slightly yellow and had the physical properties as identified in Table 1.

Then, 95 parts by weight of these resins were, respectively, melt-mixed with 5 parts by weight of carbon black by means of a twin screw extruder, cooled and then pulverized by a jetmill and subjected to a classifying machine to obtain toners T1, T2, and T3 having a particle size of from 5 to 20 μm.

To 5 parts by weight of these toners, 95 parts by weight of iron powder carrier was added, and copying was conducted by means of an electrophotographic copying machine for polyester toner modified so that the temperature of the fixing section could optionally be changed. Under different atmospheric conditions, continuous copying of 5,000 copies was perfomed at a rate of 30 copies per minute, whereby the properties were evalutated. The results are shown in Table 1-1. No offset was observed within a wide temperature range, and the fixing properties were good. The image quality was excellent at a normal temperature (20° C.) at a normal humidity (relative humidity of 60%). Then, under a high temperature high humidity condition and under a low temperature low humidity condition, the image quality decreased to some extent, but the quality was still in a practically acceptable range.

Each toner was put in a container and left at 50° C. for 24 hours, whereupon it was examined and found to be substantially free from blocking and thus had no practical problem.

TABLE 1

| Resins | | | (Unit: equivalent %) | | |
|---|---|---|---|---|---|
| | | | R1 | R2 | R3 |
| Acid components | Polybasic carboxylic acid | Trimellitic anhydride | 30 | 30 | 30 |
| | Dicarboxylic acid | Terephthalic acid | 35 | 35 | 35 |
| | | Isophthalic acid | 35 | 35 | 35 |
| Diol components | Aromatic diol | Diol A * | 20 | 30 | 50 |
| | Aliphatic diol | Ethylene glycol | 80 | 70 | 50 |
| Physical properties of resins | | Softening temp.(°C.) | 120 | 117 | 118 |
| | | Tg (°C.) | 60 | 61 | 62 |
| | | Acid value (mgKOH/g) | 1.6 | 2.5 | 2.3 |
| | | Gel content (%) | 13.3 | 18.1 | 9.1 |

| Toners | | T1 | | | T2 | | | T3 | | |
|---|---|---|---|---|---|---|---|---|---|---|
| Offset resistance (°C.) | | 165–220 | | | 160–230 | | | 155–210 | | |
| Fixing properties | | A | | | A | | | A | | |
| Blocking resistance | | B | | | A | | | A | | |
| Copying conditions & image qualities | Temp. (°C.) | 20 | 10 | 35 | 20 | 10 | 35 | 20 | 10 | 35 |
| | Humidity(%) | 60 | 15 | 85 | 60 | 15 | 85 | 60 | 15 | 85 |
| | Image quality | B | C | C | B | C | B | A | B | B |

Diol A *: Polyoxypropylene (2.4)-2,2-bis(4-hydroxyphenyl)propane

In the present invention, the evaluation of various properties of the toner was conducted by the following methods.

1. Offset resistance: Continuous copying was performed by changing the temperature of the fixing roller by every 5° C., whereby the temperature range within which no offset was observed, was evaluated.

2. Fixing properties: The solid print portion obtained by copying at a fixing temperature of 180° C. was rubbed with a rubber eraser, and the fixing properties were evaluated by the degree of removal with 5 ratings of from A (best) to E (worst) (practically acceptable upto C).

3. Blocking resistance: The degree of blocking was evaluated with 5 ratings.
   A: No blocking
   B: Slight tendency for blocking, but by gently shaking upside down, the initial state can readily be restored.
   C: Slight blocking is observed, but by shaking upside down, the practically useful state is regained.
   D: Substantial blocking observed, and when rubbed with fingers, the blocks disintegrate, but the initial state can not be restored.
   E: Complete blocking, and the blocks do not disintegrate even when rubbed with fingers.

4. Image qualilty: The copied image quality of the test pattern was visually evaluated with 5 ratings.
   A: Excellent
   B: Good
   C: Slight fogging observed, but practially acceptable.
   D: Fogging observed, and practically objectionable.
   E: Substantial fogging observed, very bad.

EXAMPLE 2

Resins R4 to R6 were prepared in the same manner as in Example 1, except that the composition of starting materials was changed as shown in Table 2, and the equivalent ratio of the entire diol components to the entire carboxylic acid components was changed to 1.18. The physical properties of these resins are shown in Table 2. By using these resins, the corresponding toners T4 to T6 were prepared in the same manner as in Example 1. The properties of these toners are shown in Table 2-1. Each toners showed excellent toner properties.

TABLE 2

| Resins | | | (Unit: equivalent %) | | |
|---|---|---|---|---|---|
| | | | R4 | R5 | R6 |
| Acid components | Polybasic carboxylic acid | Trimellitic anhydride | 20 | 20 | 20 |
| | Dicarboxylic acid | Terephthalic acid | 45 | 25 | 50 |
| | | Isophthalic acid | 25 | 55 | 30 |
| | | Sebasic acid | 10 | — | — |
| Diol components | Aromatic diol | Diol A * | 50 | 50 | 50 |
| | Aliphatic diol | Ethylene glycol | 50 | 25 | 25 |
| | | Neopentyl glycol | — | 25 | — |
| | | Butane diol | — | — | 25 |
| Physical properties of resins | | Softening temp.(°C.) | 120 | 117 | 118 |
| | | Tg (°C.) | 57 | 61 | 62 |
| | | Acid value (mgKOH/g) | 1.0 | 1.5 | 1.3 |
| | | Gel content (%) | 9.4 | 14.6 | 12.7 |

| Toners | | T4 | | | T5 | | | T6 | | |
|---|---|---|---|---|---|---|---|---|---|---|
| Offset resistance (°C.) | | 160–225 | | | 165–220 | | | 165–210 | | |
| Fixing properties | | A | | | A | | | A | | |
| Blocking resistance | | B | | | A | | | B | | |
| Copying conditions & image qualities | Temp. (°C.) | 20 | 10 | 35 | 20 | 10 | 35 | 20 | 10 | 35 |
| | Humidity (%) | 60 | 15 | 85 | 60 | 15 | 85 | 60 | 15 | 85 |
| | Image quality | A | B | B | A | B | B | A | B | B |

Diol A *: Polyoxypropylene (2.4)-2,2-bis(4-hydroxyphenyl)propane

EXAMPLE 3 AND COMPARATIVE EXAMPLE 1

Resins R7 to R11 were prepared in the same manner as in Example 1 except that the composition of starting materials was changed as shown in Table 3. The physical properties of these resins are shown in Table 3. By using these resins, the corresponding toners T7 to T11 were prepared in the same manner as in Example 1. The properties of these toners are shown in Table 3-1.

TABLE 3

| | (Unit: equivalent (%) | | | | |
|---|---|---|---|---|---|
| | Examples | | | Comparative Examples | |
| Resins | R7 | R8 | R9 | R10 | R11 |
| Entire diols/entire carboxylic acids | 1.12 | 1.18 | 1.00 | 1.37 | 1.90 |

TABLE 3-continued

|  |  |  | (Unit: equivalent (%) | | | | |
|---|---|---|---|---|---|---|---|
| (Equivalent ratio) | | | | | | | |
| Acid components | Polybasic carboxylic acid | Trimellitic anhydride | 10 | 20 | 0 | 40 | 70 |
|  | dicarboxylic acid | Terephthalic acid | 45 | 40 | 50 | 50 | 15 |
|  |  | Isophthalic acid | 45 | 40 | 50 | 10 | 15 |
| Diol components | Aromatic diol | Diol A * | 50 | 50 | 50 | 50 | 50 |
|  | Aliphatic diol | Ethylene glycol | 50 | 50 | 50 | 50 | 50 |
| Physical properties of resins | | Softening temp.(°C.) | 120 | 127 | 129 | 122 | 120 |
|  | | Tg (°C.) | 60 | 61 | 65 | 52 | 43 |
|  | | Acid value (mgKOH/g) | 1.6 | 1.2 | 1.0 | 1.5 | 2.3 |
|  | | Gel content (%) | 10.7 | 11.0 | 0 | 16.9 | 4.1 |

| Toners | | Examples | | Comparative Examples | | |
|---|---|---|---|---|---|---|
|  |  | T7 | T8 | T9 | T10 | T11 |
| Offset resistance (°C.) | | 165–240 | 160–230 | 160 No width | 155–190 | Copying impossible |
| Fixing properties | | B | A | A | A | Copying impossible |
| Blocking resistance | | A | A | A | C | E |
| Copying conditions & image qualities | Temp. (°C.) | 20 10 35 | 20 10 35 | 20 10 35 | 20 10 35 | 20 10 35 |
|  | Humidity (%) | 60 15 85 | 60 15 85 | 60 15 85 | 60 15 85 | 60 15 85 |
|  | Image quality | A B B | A B B | E — — | A B B | Copying impossible |

Diol A *: Polyoxypropylene (2.4)-2,2-bis(4-hydroxyphenyl)propane

As is apparent from Tables 1-1 and 3-1, the resins containing 10, 20 and 30 equivalent % of the polybasic carboxylic acid (trimellitic anhydride) in the entire carboxylic acids, show excellent toner properties. However, with the system using no trimellitic anhydride, the offset resistance is very poor. Whereas, with the system using trimellitic anhydride in an amount of 70 equivalent %, Tg is low at a level of 43° C. and the blocking resistance is poor, whereby the toner is found to be practically useless. Further, it is found that the resin containing 40 equivalent % of the polybasic carboxylic acid component (a) (trimellitic anhydride) in the entire carboxylic acids has low Tg at a level of 52° C., whereby the offset initiation temperature is slightly lowered.

EXAMPLE 4 AND COMPARATIVE EXAMPLE 2

Resins R12 to R15 were prepared in the same manner as in Example 1 except that the composition of starting materials was changed as shown in Table 4. In the production of Resin R15, the diol was not distilled from the reaction system under reduced pressure. Therefore, the viscosity of the reaction system did not increase, and the reaction was terminated at the same time as in the reaction for Resin R13. The physical properties of these resins are shown in Table 4. By using these Resins, the corresponding toners T12 to T15 were prepared in the same manner as in Example 1. The properties of these toners are shown in Table 4-1. The system using both of an aromatic diol and an aliphatic diol showed excellent performance. However, the system using only an aliphatic diol was inadequate in the image quality under a high temperature high humidity condition, whereas the system using only an aromatic diol had low Tg and a substantially poor blocking resistance, whereby the toner was useless for copying.

TABLE 4

|  |  |  | (Unit: equivalent %) | | | |
|---|---|---|---|---|---|---|
| Resins | | | R12 | R13 | R14 | R15 |
| entire diols/entire carboxylic acids (equivalent ratio) | | | 1.27 | 1.27 | 1.27 | 1.27 |
| Acid components | Polybasic carboxylic acid | Trimellitic anhydride | 30 | 30 | 30 | 30 |
|  | dicarboxylic acid | Terephthalic acid | 35 | 35 | 35 | 35 |
|  |  | Isophthalic acid | 35 | 35 | 35 | 35 |
| Diol components | Aromatic diol | Diol A * | 40 | 70 | 0 | 100 |
|  | Aliphatic | Ethylene glycol | 60 | 30 | 100 | 0 |

TABLE 4-continued (Unit: equivalent %)

| | | | | | |
|---|---|---|---|---|---|
| diol | | | | | |
| Physical properties or resins | Softening temp.(°C) | 127 | 133 | 146 | 110 |
| | Tg (°C.) | 60 | 62 | 56 | 42 |
| | Acid value (mgKOH/g) | 1.8 | 1.4 | 2.2 | 1.0 |
| | Gel content (%) | 15.0 | 11.7 | 10.7 | 0 |

| Toners | | Examples | | Comparative Examples | |
|---|---|---|---|---|---|
| | | T12 | T13 | T14 | T15 |
| Offset resistance (°C.) | | 165–225 | 165–220 | 155–210 | Copying impossible |
| Fixing properties | | B | A | A | C |
| Blocking resistance | | A | A | C | E |
| Copying conditions & image qualities | Temp. (°C.) | 20 10 35 | 20 10 35 | 20 10 35 | 20 10 35 |
| | Humidity (%) | 60 15 85 | 60 15 85 | 60 15 85 | 60 15 85 |
| | Image quality | A B B | A B B | B C D E | — — |

Diol A *: Polyoxypropylene (2.4)-2,2-bis(4-hydroxyphenyl)propane

COMPARATIVE EXAMPLE 3

To a monomer mixture having the composition of starting materials as identified in Table 5 and having the equivalent ratio of the entire diol component to the entire carboxylic acids of 1.00, 0.03% by weight, based on the polybasic carboxylic acids, of tin oxide was added as a polymerization catalyst. The mixture was introduced into the same separable flask as used in Example 1 and heated to 220° C. for dehydration condensation. When distilled water was removed to some extent, the viscosity of the reaction system started to increase rapidly, and about 5 minutes later, the entire system turned into a geled state, whereby it was impossible to stop the condensation reaction at a viscosity for the polymer to be withdrawn from the reactor. In an industrial production, it usually takes from 30 minutes to one hour to withdraw a product of this nature from the reactor, and therefore the above process is not practically useful.

However, this Comparative Example is an experiment on a small scale, and in order to examine the resin properties and toner properties of products, the products were forcibly taken out during the rapid increase of the viscosity and cooled to stop the reaction to obtain resins R16, R17 and R18. The physical properties of these resins are shown in Table 5. From these resins, the corresponding toners T16, T17 and T18 were prepared, respectively, in the same manner as in Example 1. The toner properties thereof are shown in Table 5-1.

The toners obtained from these resins having high acid values all had high humidity dependency of the image quality and were found to be practically useless.

TABLE 5

(Unit: equivalent %)

| Resins | | | R16 | R17 | R18 |
|---|---|---|---|---|---|
| Acid components | Polybasic carboxylic acid | Trimellitic anhydride | 80 | 50 | 30 |
| | Dicarboxylic acid | Terephthalic acid | 20 | 50 | 60 |
| | | Isophthalic acid | — | — | 10 |
| Diol | Aromatic diol | Diol A* | 60 | 60 | 60 |

TABLE 5-continued (Unit: equivalent %)

| components | Aliphatic diol | Ethylene glycol | 40 | 40 | 40 |
|---|---|---|---|---|---|
| Physical properties of resins | | Softening temp. (°C.) | 129 | 126 | 131 |
| | | Tg (°C.) | 55 | 56 | 50 |
| | | Acid value (mgKOH/g) | 70 | 64 | 58 |
| | | Gel content (%) | 7.0 | 5.1 | 4.2 |

| Toners | | T16 | T17 | T18 |
|---|---|---|---|---|
| Offset resistance (°C.) | | 165–220 | 165–175 | 165 No width |
| Fixing properties | | A | A | A |
| Blocking resistance | | B | B | C |
| Copying conditions & image qualities | Temp. (°C.) | 20 10 35 | 20 10 35 | 20 10 35 |
| | Humidity (%) | 60 15 85 | 60 15 85 | 60 15 85 |
| | Image quality | B D E | B D E | B D E |

Diol A*: Polyoxypropylene (2.4)-2,2-bis(4-hydroxyphenyl)propane

COMPARATIVE EXAMPLE 4

Resins R19 and R20 were prepared in the same manner as in Example 1 except that the composition of starting materials was changed as shown in Table 6, and the equivalent ratio of the entire diol components to the entire carboxylic acid components was changed to 1.27. The physical properties of these resins are shown in Table 6. By using these resins, the corresponding toners T19 and T20 were prepared in the same manner as in Example 1. The properties of these toners are shown in Table 6-1.

TABLE 6

(Unit: equivalent %)

| Resins | | | R19 | R20 |
|---|---|---|---|---|
| Entire diols/entire carboxylic acids (equivalent ratio) | | | 1.27 | 1.27 |
| Acid components | Polybasic carboxylic acid | Trimellitic anhydride | 30 | 30 |
| | Dicarboxylic acid | Terephthalic acid | 60 | 60 |
| | | Isophthalic acid | 10 | 10 |
| Diol components | Aromatic diol | Diol A* | 20 | 80 |
| | Aliphatic diol | Ethylene glycol | 80 | 20 |
| Physical properties of resins | | Softening temp. (°C.) | 172 | 108 |
| | | Tg (°C.) | 55 | 56 |

TABLE 6-continued

| | | (Unit: equivalent %) | | | | |
|---|---|---|---|---|---|---|
| | Acid value (mgKOH/g) | 1.2 | | 1.4 | | |
| | Gel content (%) | 11.2 | | 13.2 | | |
| Toners | | T19 | | T20 | | |
| Offset resistance (°C.) | | 178–240 | | 155–185 | | |
| Fixing properties | | C | | B | | |
| Blocking resistance | | C | | C | | |
| Copying | Temp. (°C.) | 20 | 10 | 35 | 20 | 10 | 35 |
| conditions | Humidity (%) | 60 | 15 | 85 | 60 | 15 | 85 |
| & image | Image | B | B | C | B | C | C |
| qualities | quality | | | | | | |

Diol A*: Polyoxypropylene (2.4)-2,2-bis(4-hydroxyphenyl)propane

It is apparent from Tables 1-1 and 6-1 that when the softening temperature exceeds 170° C., the fixing properties tend to be extremely poor, and the image quality tends to deteriorate, and when the softening temperature is lower than 110° C., the offset initiation temperature is lowered to a level of 185° C., whereby the offset resistance tends to be poor.

COMPARATIVE EXAMPLE 5

Resins R21 and R22 were prepared in the same manner as in Example 1 except that the composition of starting materials was changed as shown in Table 7, and the equivalent ratios of the entire diol components to the entire carboxylic acids were changed to 1.47 and 1.03, respectively. The physical properties of these resins are shown in Table 7. By using these resins, the corresponding toners T21 and T22 were prepared in the same manner as in Example 1.

TABLE 7

| | | (Unit: equivalent %) | |
|---|---|---|---|
| Resins | | R21 | R22 |
| Entire diols/entire carboxylic acids (equivalent ratio) | | 1.47 | 1.03 |
| Acid components | Polyvalent carboxylic acid | Trimellitic anhydride | 50 | 5 |
| | dicarboxylic acid | Terephthalic acid | 50 | 65 |
| | | Isophthalic acid | — | 30 |
| Diol components | Aromatic diol | Diol A* | 50 | 90 |
| | Aliphatic diol | Ethylene glycol | 50 | 10 |
| Physical properties of resins | | Softening temp. (°C.) | 130 | 158 |
| | | Tg (°C.) | 48 | 72 |
| | | Acid value (mgKHO/g) | 1.2 | 1.0 |
| | | Gel content (%) | 19.2 | 5.4 |
| Toners | | T21 | | T22 | | |
| Offset resistance (°C.) | | 155–190 | | 175–240 | | |
| Fixing properties | | A | | C | | |
| Blocking resistance | | D | | A | | |
| Copying | Temp. (°C.) | 20 | 10 | 35 | 20 | 10 | 35 |
| conditions | Humidity (%) | 60 | 15 | 85 | 60 | 15 | 85 |
| & image | Image | B | B | C | B | C | C |
| qualities | quality | | | | | | |

Diol A*: Polyoxypropylene (2.4)-2,2-bis(4-hydroxyphenyl)propane

As is apparent from Tables 1-1 and 7-1, if the glass transition temperature is lower than 55° C., the blocking resistance tends to be poor, and if the glass transition temperature exceeds 70° C., the fixing properties tend to be poor although the blocking resistance is good.

We claim:

1. A polyester resin for toner, which consists essentially of the polyester condensation reaction product of (a) from 5 to 60 equivalent %, based on the entire carboxylic acid components, of at least one member selected from the group consisting of tricarboxylic and higher poly carboxylic acids, anhydrides thereof and lower alkyl esters thereof, (b) at least one member selected from the group consisting of dicarboxylic acids and lower alkyl esters thereof, (c) at least one aromatic diol and (d) at least one aliphatic diol, and which has a softening temperature of from 100° to 170° C., a glass transition temperature (Tg) of from 50° to 70° C., an acid value of from 0.5 to 10 mgKOH/g and a gel content of from 3 to 40%.

2. The polyester resin according to claim 1, wherein the component (a) is in an amount of from 5 to 35 equivalent %, based on the entire carboxylic acid components (a) and (b).

3. The polyester resin according to claim 1, wherein the softening temperature is from 110° to 160° C.

4. The polyester resin according to claim 1, wherein the glass transition temperature (Tg) is from 55° to 70° C.

5. A process for producing a polyester resin for toner by the condensation reaction of (a) from 5 to 60 equivalent % based on the entire carboxylic acid components, of at least one member selected from the group consisting of tri and higher poly carboxylic acids, anhydrides thereof and lower alkyl esters thereof, (b) at least one member selected from the group consisting of dicarboxylic acids and lower alkyl esters thereof, (c) at least one aromatic diol and (d) at least one aliphatic diol in the presence of a catalyst, which comprises reacting the carboxylic acid components (a) and (b) with the diol components (c) and (d) for esterification or ester interchange under a condition to satisfy the formula $$4 > Y > 0.8(1+x) \quad (I)$$

where followed by crosslinking while distillating off the diol components under a reduced pressure of at most 150 mmHg, then substantially terminating the crosslinking reaction by raising the pressure of the reaction system, to obtain a polyester resin having a softening temperature of from to 170° C., a glass transition temperature (Tg) of from to 70° C., an acid value of from 0.5 to 10 mgKOH/g and a gel content of from 3 to 40%.

6. The process according to claim 5, wherein the component (a) is in an amount of from 5 to 35 equivalent %, based on the entire carboxylic acid components (a) and (b).

7. The process according to claim 5, wherein the softening temperature is from 110° to 160° C.

8. The process according to claim 5, wherein the glass transition temperature (Tg) is from 55° to 70° C.

* * * * *